Dec. 23, 1969  R. R. STEINGAS  3,485,021
PROTECTIVE DEVICE FOR ROTARY CUTTERS
Filed June 21, 1967

Inventor
Richard R. Steingas
John J. Kowalik
Attorney

United States Patent Office 3,485,021
Patented Dec. 23, 1969

3,485,021
PROTECTIVE DEVICE FOR ROTARY CUTTERS
Richard R. Steingas, Naperville, Ill., assignor to International Harvester Company, Chicago, Ill., a corporation of Delaware
Filed June 21, 1967, Ser. No. 647,773
Int. Cl. A01d 35/26
U.S. Cl. 56—295     5 Claims

ABSTRACT OF THE DISCLOSURE

A member secured to the underside of a rotary mower housing and surrounding a vertical driven shaft mounting cutter means within the housing. The member terminates at its lower end in an annular surface overlying the cutting means with slight vertical clearance therebetween. Upon striking an obstruction the cutter means is deflectable upwardly into frictional engagement with the annular surface to limit the bending moment on the drive shaft and for absorbing shock loads on the cutter means and the shaft.

BACKGROUND OF THE INVENTION

Field of the invention

The invention relates generally to harvesters and more particularly to a rotary mower of the type for cutting hay or mowing lawns for example.

Description of the prior art

In present rotary mowers the cutting blades are secured to a vertical shaft which protrudes downwardly through a housing and support structure in which the shaft is journalled. A problem with such arrangements is that the shaft is subject to extreme bending forces when the horizontally rotating blades strike an obstruction or scalp the ground. Attempts have been made to reduce shaft flexure under such conditions by securing guard members to the mower surrounding the shaft to prevent the same from flexing beyond its limits.

Although shaft flexure is reduced, the problem remains concerning the loading imposed on the cutting structure secured to the shaft. In many instances the cutting structure is deflected upwardly upon striking an obstruction. This force is directed upwardly on the cutting structure at a horizontal distance from the shaft equal to the distance from the shaft to the obstruction. The resulting vertical bending moment may be sufficient to bend or break the cutting structure and/or driving shaft requiring its repair or replacement. In conjunction with the above problems the sudden shock loads may be transmitted to the drive train and supporting structure of the mower with resultant damage thereto.

SUMMARY OF THE INVENTION

With the foregoing in mind it is accordingly a general object of the invention to provide a rotary mower with means for projecting the shaft, cutting structure, and drive train against damage resulting from the cutting structure striking obstructions during a cutting operation.

More particularly it is an object to provide a shock-absorbing and deflection-limiting member secured to the mower for reducing the vertical bending moment exerted on the cutting structure.

Another object, in accordance with the preceding object, is to provide a member secured to the mower for absorbing shock loads which would otherwise be transmitted to the drive train of the rotary mower.

Briefly the invention relates to improvements in rotary mowers of the type including a housing and support structure and a vertically disposed driven shaft or spindle journalled through the structure. A generally horizontally disposed cutting structure is secured to the shaft for rotation therewith. Means are provided on the support structure providing a surface overlying the cutting structure with a slight clearance therebetween. The surface is disposed to be frictionally engaged by the rotating cutting structure when the latter is deflected upwardly in response to striking an obstruction during the cutting operation. This engagement effects a shock-absorbing and deflection-limiting action on the components of the mower.

DESCRIPTION OF THE PREFERRED EMBODIMENT

Figure 1:
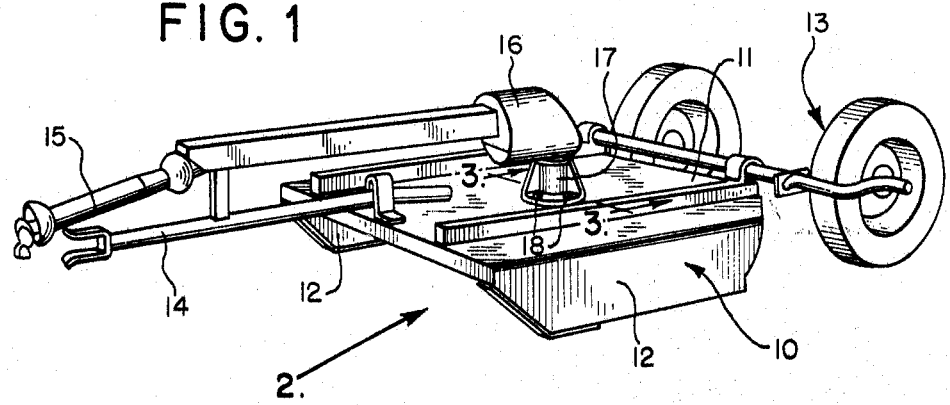
FIGURE 1 is a perspective view of a rotary cutter or mower to which the invention is applied.

Referring first to FIGURE 1 there is shown a rotary cutter having a housing indicated generally at 10 which includes a horizontal top wall 11 and depending side walls 12. A wheel assembly 13 of suitable design is secured to the cutter housing 10 enabling the cutter to be pulled over the ground. A suitable hitch member 14 is secured to the cutter for coupling the same to a tractor (not shown).

The rotary cutter is adapted to be powered from the tractor through a power take-off shaft 15 extending into a gear box 16. The gear box 16 is mounted on a spindle support member 17 which in turn is secured on the top wall 11 by means of bolts 18.

Figure 2:
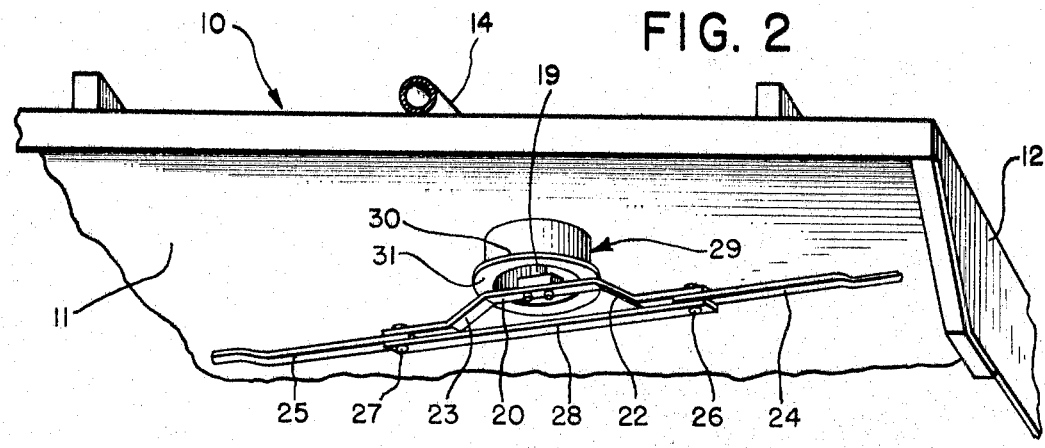
FIGURE 2 is a fragmentary perspective view taken in the direction of arrow 2 of FIGURE 1 illustrating the underside of the mower incorporating the invention.
Figure 3:
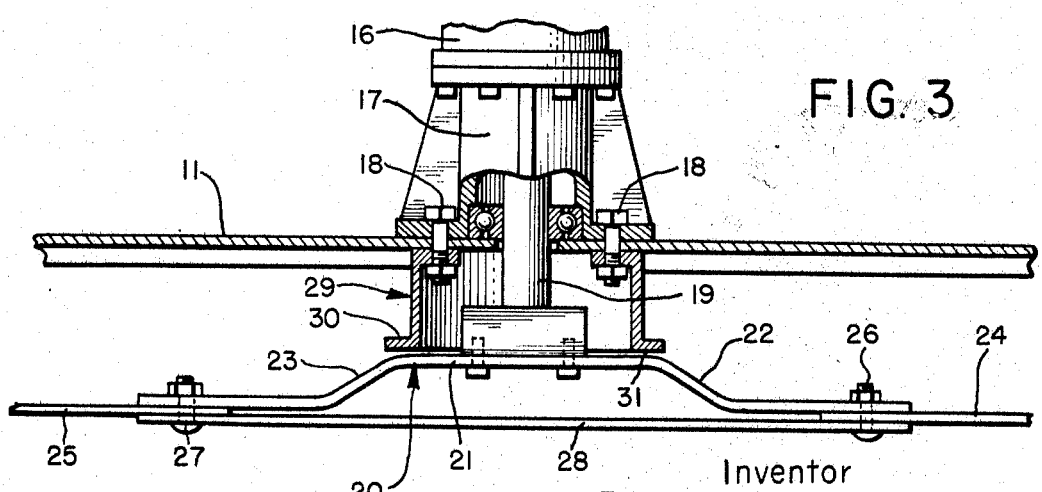
FIGURE 3 is an enlarged fragmentary vertical section view taken in the direction of arrows 3—3 of FIGURE 1 further illustrating the invention.

Referring now to FIGURES 2 and 3, a vertically disposed shaft or spindle 19 is journalled in the support member 17 and projects downwardly through the top wall 11 as shown. It will, of course, be understood that the shaft 19 is rotatably driven by the PTO 15 through the gear box 16.

The cutting structure of the mower includes a rotor bar 20 secured to the lower end of the shaft 19 and including a horizontal intermediate section or holder 21 and downwardly and outwardly inclined end portions 22 and 23. Elongated cutter blades 24 and 25 are coupled to the end portions 22 and 23 respectively by means of bolts 26 and 27 as shown. A horizontally disposed support bar or spanner 28 is coupled by the bolts 26 and 27 to the cutting structure as shown for strengthening the structure.

In accordance with a feature of the invention, a ring-like member 29 is secured to the underside of the top wall 11 and to the support member 17 by means of the bolts 18. The member 29 concentrically surrounds the shaft 19 and terminates at its lower end in an annular flange 30 defining a downwardly facing annular surface 31. The surface 31 is disposed in a horizontal plane in slightly spaced relation above the horizontal section 21 of the rotor bar 20 and concentrically about the shaft 19.

OPERATION

In normal operating conditions the cutting structure rotates out of contact with the surface 31 so that the illustrated clearance is maintained therebetween. In the event the cutter blades 24 and 25 strike an obstruction, the cutting structure may be deflected upwardly so that the rotor bar 20 engages the surface 31. This engagement limits the bending load imposed on the shaft 19. Moreover, the vertical bending moment exerted on the cutting structure will be reduced below that sustained in the absence of the member 29 by virtue of the surface 31 being radially interposed between the shaft 19 and the point at which the obstruction is struck by the cutter blades. The effect then is to increase the load or force-supporting capacity of the cutting structure without damaging the same.

In addititon to the foregoing effects the frictional engagement of the rotor bar against the surface 31 serves to absorb some of the torque and shock load normally transmitted to the shaft 19 and the power train of the mower.

Various changes falling within the scope and spirit of the invention will occur to those skilled in the art. The invention is therefore not to be thought of as limited to the specific embodiments set forth.

What is claimed is:

1. In a rotary mower having a support and a vertically disposed driven shaft journalled on the support, a cutter blade assembly mounted on the shaft, a tubular member generally concentric with the shaft presenting a substantially annular transverse surface adjacent to the shaft and spaced from the cutter blade assembly such that upon deflection of said assembly such will contact said surface to prevent undue bending or stress being applied to said shaft.

2. The invention according to claim 1 and said member being substantially annular.

3. The invention according to claim 1 and said surface being substantially horizontal.

4. The invention according to claim 1 and said blade assembly comprising a holder having downwardly offset end portions and an intervening substantially straight portion presenting a generally flat surface for engagement with said annular surface, said flat surface facing upwardly and said annular surface facing downwardly, and blades mounted on said end portions disposed below the level of said surfaces.

5. The invention according to claim 4 and said member extending downwardly from the support and having a lower edge with an outturned flange having said annular surface thereon of substantial width.

References Cited

UNITED STATES PATENTS

| | | | |
|---|---|---|---|
| 2,940,241 | 6/1960 | Stahl | 56—295 XR |
| 2,942,400 | 6/1960 | Sylvester | 56—25.4 XR |
| 2,963,844 | 12/1960 | Engler | 56—295 |

RUSSELL R. KINSEY, Primary Examiner